United States Patent
Schupke et al.

(10) Patent No.: US 11,460,840 B2
(45) Date of Patent: Oct. 4, 2022

(54) METHOD FOR OPERATING AN UNMANNED AERIAL VEHICLE AS WELL AS AN UNMANNED AERIAL VEHICLE

(71) Applicant: Airbus Defence and Space GmbH, Taufkirchen (DE)

(72) Inventors: Dominic Schupke, Taufkirchen (DE); Adran Exposito Garcia, Taufkirchen (DE)

(73) Assignee: Airbus Defence and Space GmbH

( * ) Notice: Subject to any disclaimer, the term of this patent is extended or adjusted under 35 U.S.C. 154(b) by 231 days.

(21) Appl. No.: 16/709,179

(22) Filed: Dec. 10, 2019

(65) Prior Publication Data

US 2020/0201316 A1    Jun. 25, 2020

(30) Foreign Application Priority Data

Dec. 21, 2018  (EP) ...................... 8215039

(51) Int. Cl.
| | |
|---|---|
| *G05D 1/00* | (2006.01) |
| *G05D 1/10* | (2006.01) |
| *B64C 39/02* | (2006.01) |
| *G08G 5/00* | (2006.01) |

(52) U.S. Cl.
CPC ......... *G05D 1/0022* (2013.01); *B64C 39/024* (2013.01); *G05D 1/106* (2019.05); *G08G 5/0013* (2013.01); *G08G 5/0034* (2013.01); *B64C 2201/12* (2013.01); *B64C 2201/146* (2013.01)

(58) Field of Classification Search
CPC .................................................... G05D 1/0022
See application file for complete search history.

(56) References Cited

U.S. PATENT DOCUMENTS

| | | | |
|---|---|---|---|
| 9,660,718 B2 * | 5/2017 | Jalali ...................... | H04W 16/28 |
| 10,351,240 B1 * | 7/2019 | Sills ....................... | B64C 39/024 |
| 10,511,091 B2 * | 12/2019 | Teague ............... | H04B 7/18504 |
| 2007/0168090 A1 | 7/2007 | DeMarco et al. | |
| 2010/0292871 A1 * | 11/2010 | Schultz ................. | G01S 13/865 |
| | | | 342/29 |
| 2015/0197010 A1 | 7/2015 | Ruuspakka et al. | |
| 2015/0323932 A1 * | 11/2015 | Paduano ................ | G06Q 50/28 |
| | | | 701/3 |
| 2017/0098197 A1 * | 4/2017 | Yu .......................... | G16H 10/60 |

(Continued)

FOREIGN PATENT DOCUMENTS

| | | | | |
|---|---|---|---|---|
| EP | 2884305 A1 * | 6/2015 | ............... | G08G 5/02 |
| WO | 2018086140 A1 | 5/2018 | | |
| WO | WO 2018086140 A1 * | 5/2018 | ............... | G08G 5/02 |

OTHER PUBLICATIONS

Machine translation of Taiwanese Patent Pub. No. TWI687111B that was filed in 2016.*

(Continued)

*Primary Examiner* — Jean Paul Cass
(74) *Attorney, Agent, or Firm* — Lerner, David, Littenberg, Krumholz & Mentlik, LLP

(57) ABSTRACT

A method for operating an unmanned aerial vehicle, which is flight-controlled by a flight control unit to follow a given trajectory, includes an optimization of the trajectory based on a simulation model of the unmanned aerial vehicle and a communication link to a ground station to form a trajectory along which a certain connection quality to the ground station can be maintained.

13 Claims, 4 Drawing Sheets

(56) References Cited

U.S. PATENT DOCUMENTS

| | | | | |
|---|---|---|---|---|
| 2018/0017973 A1* | 1/2018 | Teague | ............... | G08G 5/0069 |
| 2019/0049958 A1* | 2/2019 | Liu | ....................... | G01S 7/497 |
| 2019/0079509 A1* | 3/2019 | Bosworth | .......... | G06Q 10/0832 |
| 2019/0340013 A1* | 11/2019 | Celia | ..................... | G06Q 30/06 |
| 2020/0043348 A1* | 2/2020 | Ghosh | ................... | G08G 5/025 |
| 2020/0229206 A1* | 7/2020 | Badic | ............... | H04W 28/0226 |
| 2020/0265726 A1* | 8/2020 | Dupray | ............... | G08G 5/0043 |
| 2020/0394708 A1* | 12/2020 | Celia | ................. | G06Q 30/0201 |
| 2021/0241634 A1* | 8/2021 | Sarim | ................. | G08G 5/0013 |
| 2021/0253128 A1* | 8/2021 | Nister | .............. | B60W 60/0027 |

OTHER PUBLICATIONS

Jin, Ying et al., IEEE, Joint Optimization of relay position and power allocation in cooperative broadcast wireless networks, Center for Advanced Communications, Villanova University, (https://ieeexplore.ieee.org/stamp/stamp.jsp?tp=&arnumber=6288422 )(2012).*
Cimino, Mario, G, et al., Combining stigmergic and flocking behaviors to coordinate swarms of drones performing target search, 2015 6th International Conference on Information, Intelligence, System and Applications (IISA) (IEEE Xplore, https://ieeexplore.ieee.org/abstract/document/7387990 (Jul. 6, 2015) (hereinaf.*
Extended European Search Report for Application No. 18215039.1, dated Jun. 25, 2019, 8 pages.

* cited by examiner

METHOD FOR OPERATING AN UNMANNED AERIAL VEHICLE AS WELL AS AN UNMANNED AERIAL VEHICLE

FIELD OF THE INVENTION

The invention relates to a method for operating an unmanned aerial vehicle. The invention further relates to an unmanned aerial vehicle.

BACKGROUND OF THE INVENTION

Missions for unmanned aerial vehicles (UAV) are often planned by taking into consideration a fuel consumption, a mission performance and a probability of mission success. After performing such a planned mission, a UAV returns to its home position. This method is optimal when route by route can be assessed before the mission, or when the number of missions is kept relatively low. However, during the mission the quality of a communication link between the UAV and a ground station may at least in some sections be reduced or insufficient.

BRIEF SUMMARY OF THE INVENTION

It may thus be beneficial to plan or conduct a mission in a way that a sufficient quality of a communication link can maintained. Aspects of the invention therefore relate to operating an unmanned aerial vehicle in a way that the quality of the communication link can be maintained throughout a flight mission.

A method for operating an unmanned aerial vehicle comprises the steps of defining at least one initial waypoint for creating an initial trajectory, receiving geographic information along the trajectory, conducting a numerical simulation of a communication link between the unmanned aerial vehicle along the trajectory and at least one predetermined ground station at a predetermined ground station position, which comprises calculating a quality factor for the communication link under consideration of the geographic information, and comparing the quality factors with at least one predetermined minimum quality factor, and in case of an insufficient quality factor on the trajectory, adjusting the position of at least one waypoint to form an adjusted trajectory, and repeating the numerical simulation of the communication link until the quality factors along the adjusted trajectory reach at least the minimum quality factor, to form an optimized final trajectory.

Thus, a method for operating a UAV is proposed, which significantly differs from known methods. The proposed method defines an iteration process for optimizing a trajectory of an unmanned aerial vehicle. Other than known methods, it is also taken into account to improving the connectivity between the UAV and a ground station. In particular, an urban environment, where the vehicle will be operated, is challenging due to a heterogenous structure with different coexisting topologies. In air to ground communication, the signal quality faces effects such as multipath, Doppler shift and shadowing. In a worst-case scenario, the signal may degrade to the point that reception is no longer possible. In order to maintain a stable communication, techniques such as modulation schemes and different waveforms are applied to tackle distortion of the signal. Nevertheless, this has been a suitable solution for static environments where conditions are predefined and standard. According to an aspect of the invention, a novel technique to enhance connectivity through the flight will be proposed.

An aspect relates to maintaining the quality of connection through the trajectory to avoid disruption of the signal.

At first, at least one waypoint may be defined for creating the initial trajectory. In a most simple case, a single waypoint in the form of a desired target is defined. Hence, the initial trajectory may be a straight line from a starting point to the target. In one case, this initial trajectory may be provided to a flight control unit or another computer unit to allow the UAV to follow the trajectory directly before conducting the signal quality driven optimization. The optimization may then be conducted during the flight. In another case, the optimization may be conducted once, to allow the UAV to start with an already optimized trajectory and then continuously re-optimize the trajectory during flight. Of course, in the previous case a re-optimization may be conducted throughout the flight as well. If the situation is that the airspace is populated e.g. with autonomous flying objects with different applications such as flying taxis, cars, medical transport or parcel transport, a fix planning of each route or trajectory may not be feasible.

The quality of the link may be considered throughout the flight and the trajectory is adapted to have the best connection at any given time. This means, that a trajectory may constantly be adjusted to maintain a desired signal quality.

For the purpose of optimization, the connection quality during the flight is simulated. If it turns out that the connection quality is not as desired at any section of the trajectory, the trajectory is changed and the simulation is conducted again. This is repeated, i.e. the signal quality over the changed trajectory is simulated again, until it meets the requirements. Thus, the method comprises an optimization loop for optimizing a trajectory for a UAV that takes account of the signal quality.

The signal quality depends on a variety of parameters. These may comprise the distance from the UAV to the respective ground station, the existence of potential obstacles in the line of sight, shadowing effects resulting from the installation position of antennas on the UAV, the momentary orientation of the UAV, reflection and absorption effects depending on ground characteristics and buildings underneath the trajectory as well as possible interferences. Thus, receiving geographical information may be an important step in the process of simulating the signal quality. For example, receiving geographical information may comprise receiving terrain information and an elevation profile from a data source through respective queries. The data source may be a publicly available data source or a private data source. The geographic information may be collected at a plurality of positions along the trajectory. These positions may be represented by a plurality of distanced points distributed along the trajectory. The number of these may be increased or decreased depending on the desired accuracy for the geographic information. It is also feasible to gather geographic information that are lateral thereto. Hence, for example the geographic information along a stripe-shaped area underneath the trajectory may be considered. The relevant amount of information may be chosen according to flight altitude or other parameters.

The simulation may be conducted by an algorithm that is capable of calculating a signal transfer between the UAV and the at least one ground station. The precision of the simulation can be increased with increasing the number of considered increments or incremental positions along the trajectory for the individual simulation calculations as well as the level of detail of the simulation. A precise simulation of the communication link enables to determine a quality factor for the communication link, which allows to evaluate, whether the signal quality or data transfer quality is sufficient.

For maintaining a minimum quality of the communication link, it is proposed to define at least one minimum quality factor. The quality factor along the trajectory should equal at least the minimum quality factor. At the above mentioned considered incremental positions or individual positions along the trajectory the respective quality factors may be compared to the minimum quality factor. In case of an occurrence of a quality factor that is too low the shape of the trajectory is adjusted and the whole simulation is conducted again. This is repeated until the quality factors along the trajectory all meet the requirement of the minimum quality factor.

Adjusting the shape of the trajectory may refer to a variety of possible options. For example, the trajectory may be adjusted by changing the course to greater or lower altitudes or to introduce a certain curvature that allows to improve the signal quality, e.g. by reducing shadowing, reflection or absorption effects. Altogether, the method according to an aspect of the invention allows to influence the flight of a UAV by adjusting the trajectory to improve the quality of a communication link.

A preferred embodiment further comprises the step of a numerical simulation of a flight of the unmanned aerial vehicle along the trajectory, wherein the calculating of the quality factor is conducted under consideration of simulated flight states along the trajectory. By conducting the flight simulation of the UAV, flight states along the trajectory can be determined. These include attitude information, such as roll, pitch and yaw, as well as heading information and thrust. Thus, the position and orientation of the antenna or the antennas of the UAV can be determined for a plurality of positions along the trajectory with a certain desired precision. Based on the precise spatial orientation and position of the antenna, the simulation of the communication link can be conducted with a higher precision along these respective positions along the trajectory.

In an advantageous embodiment, the numerical simulation is also repeated before repeating the numerical simulation of the communication link. Thus, for each adjusted trajectory, the precise antenna positions can be determined.

Advantageously, the unmanned aerial vehicle may be flight-controlled by a flight control unit to follow a given trajectory, wherein the method further comprises providing the final trajectory to the flight control unit. Thus, after finding an adjusted trajectory with a sufficient communication quality, the flight control unit in the UAV can continue the flight with the adjusted trajectory.

In an advantageous embodiment, conducting the numerical simulation of the flight comprises executing a dynamic model of the UAV and the flight control unit to control the dynamic model of the UAV to follow the given trajectory. The dynamic model of the UAV may comprise a set of equations, that are capable of defining the dynamic behavior of the UAV during flight. This also comprises a description of the aerodynamic behavior. Depending on the precision that is required for determining the quality factor of the communication link, the dynamic model may be a simplified, linear model or a more sophisticated, nonlinear model. Furthermore, the actual simulation may be conducted with a fixed time step or a dynamically adjusted time step. Besides the model for the UAV itself, the simulation may also comprise a simulation of the flight control unit, which is responsible for moving control surfaces of the UAV, for adjusting the engine thrust and for receiving and processing sensor information. Thus, the combination of the flight control unit and the dynamic UAV model leads to a precise statement of the attitude and heading, which influence the momentary position of on board antennas used for the communication link. It may be feasible to linearize the dynamic model and to maintain a minimum time step value for the simulation to avoid unpredictable discontinuities in the model, which may lead to continuously reducing the time step values and thus block the simulation.

In a further advantageous embodiment, receiving geographic information comprises retrieving terrain characteristics and elevation information along the trajectory. Elevation information may comprise data that define the elevation of the ground relative to sea level. It is to be understood that the elevations of a ground area underneath a line of sight between the UAV and the ground station may influence the signal propagation characteristics. Particularly in an urban environment, the elevation may be rather diverse over a certain area. Thus, it may be preferred to take elevation information into account, that are associated with an area from underneath the UAV to a desired target. Further, terrain characteristics may also clearly influence the signal propagation due to differing reflection and absorption conditions. It may be feasible to retrieve information about the terrain being covered by roads, by water, by vegetation, whether they are bare ground or city ground. For example, water may clearly influence the reflection. By combining the information of elevation information and terrain characteristics it may be possible to gain knowledge of the altitude of reflected rays.

Preferably, conducting the numerical simulation of the communication link comprises executing a deterministic channel model for a signal propagation depending on the geographic information and UAV-related boundary conditions. The deterministic channel model for the signal propagation allows to clearly determine the quality of the communication link. To ensure an acceptable performance of the communication link, which may also be referred to a wireless channel, the shadowing caused by the UAV structure needs to be analyzed. During manoeuvres, structural elements such as wings may interpose between an antenna of the UAV and the ground station. Since these usually only have a little transparency to radio signals, they may reduce the quality of the communication link. In order to analyze the influence of the frame of the UAV on the wireless channel performance, a geometric model of the UAV may be added to the channel model. It may be feasible to provide a simplified geometric model to the channel model, since the size and precision of a detailed model clearly exceeds the requirements for the desired studies. For example, a reduced geometric mesh may be used to describe the UAV frame with a lean and efficient number of structural nodes to achieve a desired accuracy. Of course, the installation position of the antenna(s) is to be included into the channel model to take obscuration effects into account. Still further, the size and beam characteristics or radiation pattern of the antenna(s) used for the communication link may be defined to include this information into the respective channel calculation. While the radiation pattern of the antenna may be calculated with a basic or usual characteristic of a respective type of antenna, it may be worthwhile to rely on a radiation pattern provided by the manufacturer of the antenna. Through including the whole chain relevant for the communication into the channel model, obscuration effects can be mitigated by the method according to the invention, since the adjusted route may exemplarily avoid manoeuvres with steep turns that result on the UAV interfering line of sight.

For the sake of better understanding, in the following the channel model is explained in further detail. Radio channel models for narrowband and wideband transmissions are commonly used to predict coverage of a wireless link and system performance. These methods are classified as deterministic, statistical/empirical and semi-deterministic or site specific models. For wireless extended security methods, deterministic models have been employed with ray tracing techniques. Ray tracing takes into account free space loss, reflected and refracted components as well as diffracted and scattered contributions to the line of sight component. It may be feasible to choose the narrowband single input-single output model as the channel model. The frequency response from the channel considering distortionless transmission is $$H[\omega_c] = Ae^{-j2\pi f_c \tau}$$
$$= Ae^{-j\omega_c \tau}$$
$$= Ae^{-j\phi_c}$$

with the amplitude of the sinusoid is modified by a constant multiplying factor A, while its phase is shifted by a constant value equal to $\phi_c$. This means that the channel function is time invariant and single valued at that particular frequency. The amplitude of the signal is obtained using the following equation:

$$A = \frac{\sqrt{\epsilon_{r1}} - \sqrt{\epsilon_{r2}}}{\sqrt{\epsilon_{r1}} + \sqrt{\epsilon_{r2}}} e^{\left[\frac{1}{2}\left(\frac{4\pi\sigma_h \theta_i}{\lambda}\right)^2\right]}$$

where the first fraction models the reflection that depends on the terrain characteristics, $\epsilon_{r1}$ being the relative permittivity of the propagation media, and $\epsilon_{r2}$ being the permittivity of the terrain. The second part of the amplitude models the rugosity of the terrain, with $\sigma_h$ representing the standard deviation of the rugosity and $\theta_i$ the angle of incidence of the ray on the surface of the terrain.

Considering a variation in the phase path length maintaining constant amplitude, the previous equation may be written as the radiated electric field:

$$E_R[t] = A\cos[2\pi f_c(t - \tau[t])]$$
$$= A\cos[2\pi f_c t - \phi_c[t]]$$

In mobile radio studies it is customary to model the phase variation by a Doppler spectrum with a U shape. This is based on the scattering model, which assumes a large number of multipath components. To derive the scattering model at first a vertically polarized wave arriving at a point in space with angle $\alpha_n$ with the horizontal plane and an angle $\beta_n$ in elevation must be considered. The radiated electric field is:

$$E_R[t] = Ae^{-j\beta a_\beta R a_R} e^{j\omega_c t}$$

where $a_R$ is the unit vector along R being the distance to the observation point, $\beta$ the wave number and $a_\beta$ the unit vector along the direction of wave propagation. Expanding these relationships:

$$\beta a_\beta = \beta(\cos[\alpha_n]\cos[\beta_n]a_x + \sin[\alpha_n]\cos[\beta_n]a_y + z_0\sin[\beta_n]a_z)$$

$$Ra_R = x_0 a_x + y_0 a_y + z_0 a_z$$

if the transmitter moves with velocity v in the xy-plane in an angle γ with respect to the x axis, in a time interval Δt the new xyz coordinates are:

$$x = x_0 + v\Delta t \cos[\gamma]$$

$$y = y_0 + v\Delta t \sin[\gamma]$$

$$z = z_0$$

the radiated electric field at the observation point is now:

$$E_n[t] =$$
$$A_n e^{\left[\omega_c t - \frac{2\pi}{\lambda}[x_0\cos[\alpha_n]\cos[\beta_n] + y_0\sin[\alpha_n]\cos[\beta_n] + z_0\sin[\beta_n] + v\Delta t\cos[\alpha_n - \gamma]\cos[\beta_n]] + \Phi_n\right]}$$

where the term $(2\pi/\lambda)v\Delta t \cos[\alpha_n - \delta]\cos[\beta_n]$ constitutes a time-varying component, $A_n$ is the amplitude of the n-th ray, $E_n$ is the radiated field of the n-th ray at the observation point. The derivative of this term with respect to time forms an angular frequency offset:

$$\omega_n = 2\pi f_n = \frac{2\pi}{\lambda} v\Delta t\cos[\alpha_n - \delta]\cos[\beta_n]$$

which is the Doppler shift of the n-th ray component. This channel model constitutes a deterministic model. Information about the position of the UAV and ground or receiving station as well as site characteristics must be known in order to determine the characteristics of the wireless channel. The parameters marked in the frequency offset equation that refer to the position of the transmitter require the availability of information about the position and velocity of the UAV at every point.

Thus, as explained above, the boundary conditions related to the unmanned aerial vehicle may exemplarily comprise a shape and a material of the unmanned aerial vehicle, as well as the installation position and orientation of at least one antenna on the unmanned aerial vehicle that is associated with the communication link.

In a further advantageous embodiment, the step of adjusting the position of at least one waypoint to form an adjusted trajectory comprises a Pareto optimization, a particle swarm optimization or an optimization based on evolutionary algorithms. The variable to optimize is the overall connection quality through the trajectory. The optimization algorithm may tend to go towards the trajectory with the highest received gain. With this optimization goal, zones with unfavorable channel conditions are avoided. One of the possible algorithms is a Pareto optimization algorithm, which is also known as a multi-objective optimization, which involves multiple objective functions. It may be realized in the form of the so-called goal-attainment algorithm. It may be used if several objective functions, such as the trajectory length and the risk of signal loss, are considered at the same time. In those cases, it is difficult to combine those objectives in a single one since the relative importance of each objective cannot be determined a-priori. Thus, the objectives are combined in different manners performing several uni-objective optimizations. Each one of these optimizations provides a possible solution, which is referred to as a Pareto optimal solution, and all these solutions conform the so-called Pareto front. Once the Pareto front is obtained, a proper assessment of the gain in one objective when relaxing the other can be made, and the most convenient point of the Pareto front can be selected. The goal-attainment algorithm can be used to determine the Pareto front, and another algorithm is needed to select the most convenient solution of the Pareto front, in view of the full set of solutions of that the front finally offers. The further optimization, i.e. the particle swarm optimization, is based on the study of species like bees, birds or a flock of other animals. It represents a stylized flock of animals, such as bees, who explore their complete environment in order to find the best resources, at the same time the other bees will know where a bee has already been. These algorithms are extremely flexible, can be combined with other algorithms and require a low knowledge of the surroundings. Of course, further algorithms may be possible.

It is preferred that the step of adjusting the position of at least one waypoint to form an adjusted trajectory comprises applying at least one geometry constraint in the adjusted trajectory. Thus, not only an iterative algorithm is responsible for the final trajectory of the unmanned aerial vehicle, but also some geometry constraints. These may limit the extension or orientation of the trajectory based on predefined restrictions. These may inter alia include zones, into which the unmanned aerial vehicle must not fly.

It is advantageous if the at least one geometry constraint is selected from a group of geometry constraints, the group consisting of maintaining a certain altitude above the terrain, providing a minimum distance to buildings on the ground for collision avoidance, restricting the adjusted trajectory to given map limits, avoiding flight prohibited zones, and maintaining a safety distance to surrounding aircraft.

Furthermore, it may be advantageous if defining at least one initial waypoint for creating the initial trajectory comprises defining a set of initial waypoints for a desired flight mission. Thus, the initial trajectory, from which an optimized trajectory is created, is not necessarily a straight path between a starting point and a desired target. It may also be a curved line, that may belong to a certain surveillance mission, wherein the predefined trajectory may be fine-tuned under taking into account the communication link quality, such that e.g. the bank angles or other manoeuvres are adjusted to maintain the desired communication link quality.

It is advantageous if the simulation is continuously and repeatedly conducted during the flight of the unmanned aerial vehicle. The quality of the communication link may be considered very important since in a case of an emergency or an undesired condition of the unmanned aerial vehicle, backup or emergency procedures need to be established. One of them may include pass the control to a remote pilot that will guide or monitor the vehicle. In such a case a flaw in the communication link is to be prevented. Since boundary conditions may change during flight, it is particularly advantageous to repeatedly conduct the simulation and, consequently, the optimization of the communication link.

It may be preferred that the simulation is conducted inside the unmanned aerial vehicle. This may particularly focus on the flight control unit or a superordinate computer unit, such as a flight management unit, which is able to provide high-level information to the flight control unit, such as the trajectory, which is to be followed by the unmanned aerial vehicle through lower-level control operations of the flight control unit. However, by conducting the simulation on board the unmanned aerial vehicle it is less dependent on an exterior system. This may be beneficial since the unmanned aerial vehicle may always be able to assume a trajectory which leads to a good quality of the communication link.

The invention further relates to an unmanned aerial vehicle, comprising a computer unit, wherein the computer unit is capable of conducting the above identified method.

In an exemplary embodiment, the computer unit is a flight control unit.

BRIEF DESCRIPTION OF THE DRAWINGS

Other characteristics, advantages and potential applications of the present invention result from the following description of the exemplary embodiments illustrated in the figures. In this respect, all described and/or graphically illustrated characteristics also form the object of the invention individually and in arbitrary combination regardless of their composition in the individual claims or their references to other claims. Furthermore, identical or similar objects are identified by the same reference symbols in the figures.

DETAILED DESCRIPTION

Figure 1:
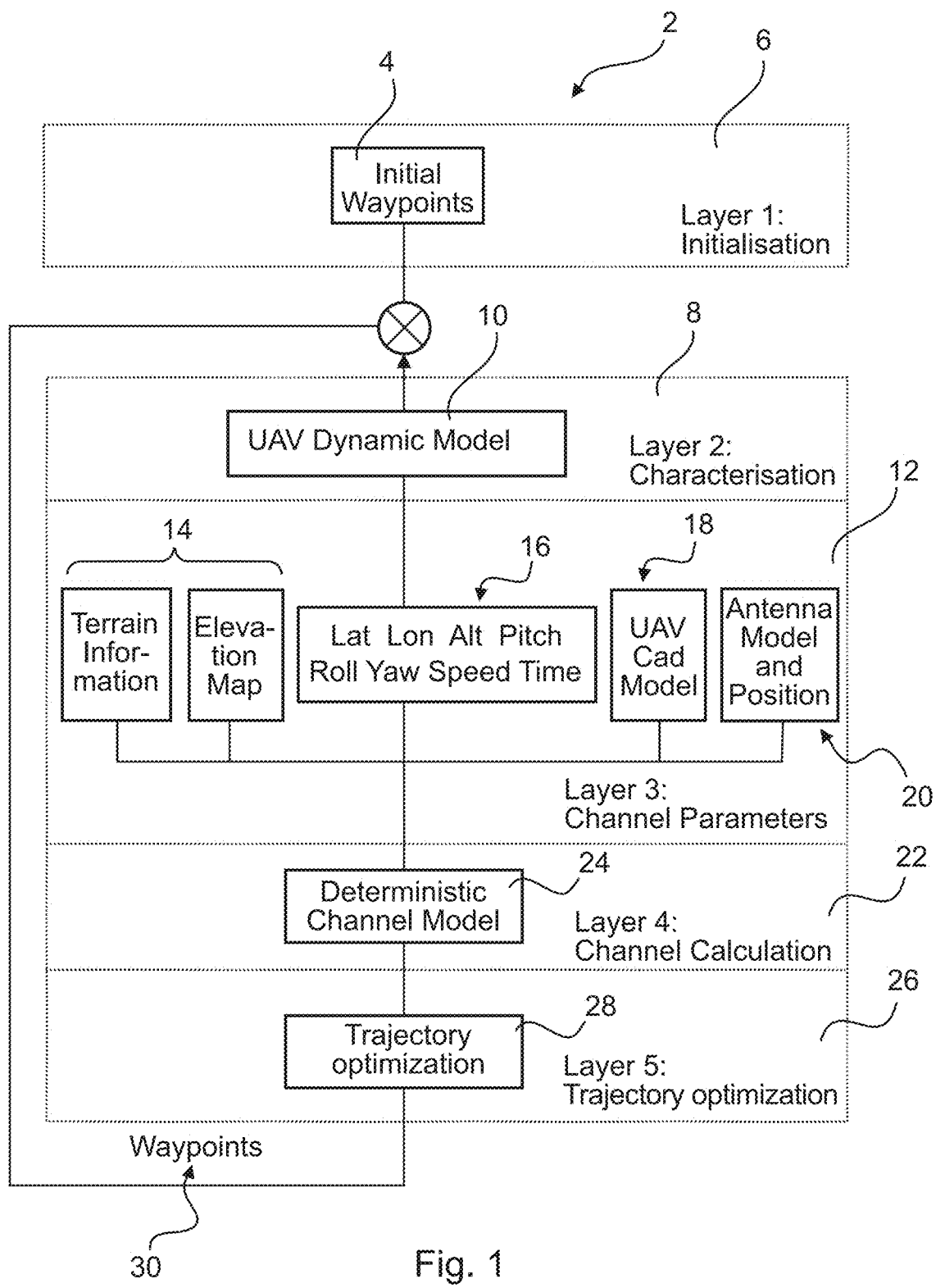
FIG. 1 shows an abstract layer-wise illustration of a method according to an aspect of the invention.

FIG. 1 shows an abstract illustration of a method 2 for operating an unmanned aerial vehicle. The method 2 is exemplarily shown in the form of different functional layers that compose the method 2.

First of all, at least one waypoint 4 is defined 6 for creating an initial trajectory. This may also include the definition of a plurality of waypoints 4, that may refer to a more sophisticated initial trajectory. However, simply a single target point for a certain flight mission may be defined as an initial waypoint 4 in order to let the method 2 adjust the resulting simple initial trajectory to meet the requirements. This step is named layer 1: initialization.

In a subsequent layer, a numerical simulation 8 of a flight of the unmanned aerial vehicle along the trajectory is conducted. The respective layer is named layer 2: aircraft characterization. For this, a dynamic UAV model 10 is executed on a computer unit, wherein the dynamic UAV model 10 is capable of characterizing the mechanical and aerodynamic behavior of the unmanned aerial vehicle. This may also include executing a dynamic model of a flight control unit, which is dedicated for controlling the unmanned aerial vehicle. The dynamic model of the flight control unit may be integrated into the dynamic UAV model 10, as it is responsible for controlling the dynamic UAV model 10 in the simulation 8 to follow the given trajectory.

A further step is directed to a plurality of tasks of data collection 12, which are summarized in form of layer 3: channel parameters. For example, geographic information for a plurality of positions along the trajectory are received 14. Further, a number of state variables from the dynamic UAV model 10 is collected 16. This may lead to a vector of state variables at a single point in time or to a matrix having state variables over several points in time, e.g. during the whole flight along the trajectory or a section thereof. Further, shape information 18 to describe the geometric shape of the UAV as well as antenna specific information 20 are provided, for example by a set of data stored in the computer unit that conducts the simulation 8. These antenna-specific information 20 may be provided in the form of a static set of data.

All data from the data collection step 12 are fed into a simulation 22 of the communication link between the unmanned aerial vehicle and a predetermined ground station position. For this, a deterministic channel model 24 is created, that allows to calculate a quality factor for the communication link on the consideration of the geographic information, the state variables 16, the shape information 18 as well as the antenna specific information 20. If there is an insufficient quality factor on the trajectory, an optimization step 28 is conducted to form adjusted waypoints 30, which are then fed back into the simulation 8. Thus, as a result, an optimized trajectory may be found that leads to a minimum quality factor and thus, a sufficient quality of the communication link.

Figure 2:
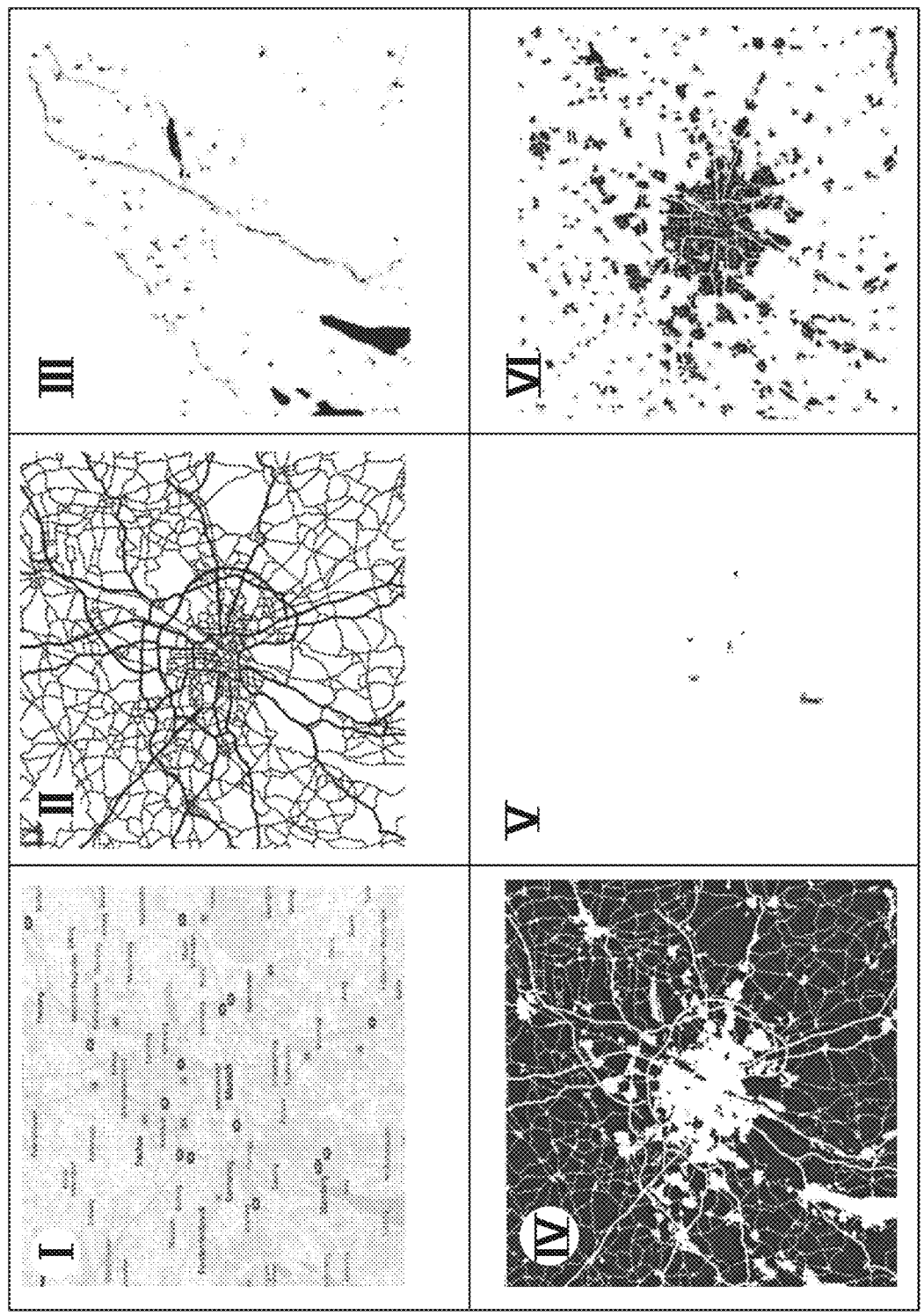
FIG. 2 shows several maps containing geographic information.

FIG. 2 shows an example of different geographic information that may be derived from publicly available sources during the step 14 of receiving geographic information. These are shown in six maps I to VI. Map I illustrates a common map with marked places, overlaid elevation-dependent shadings and ground-dependent shadings. Map II shows the coverage of map I by roads. Map III shows the map coverage by water. Map IV is directed to the coverage by vegetation. In map V the coverage by bare ground is depicted and map VI shows the coverage by city ground. All these different information are fed into the deterministic channel model 24 in FIG. 1 to calculate potential reflection and absorption effects of radio waves sent out or received by antennas of the UAV.

Figure 3:
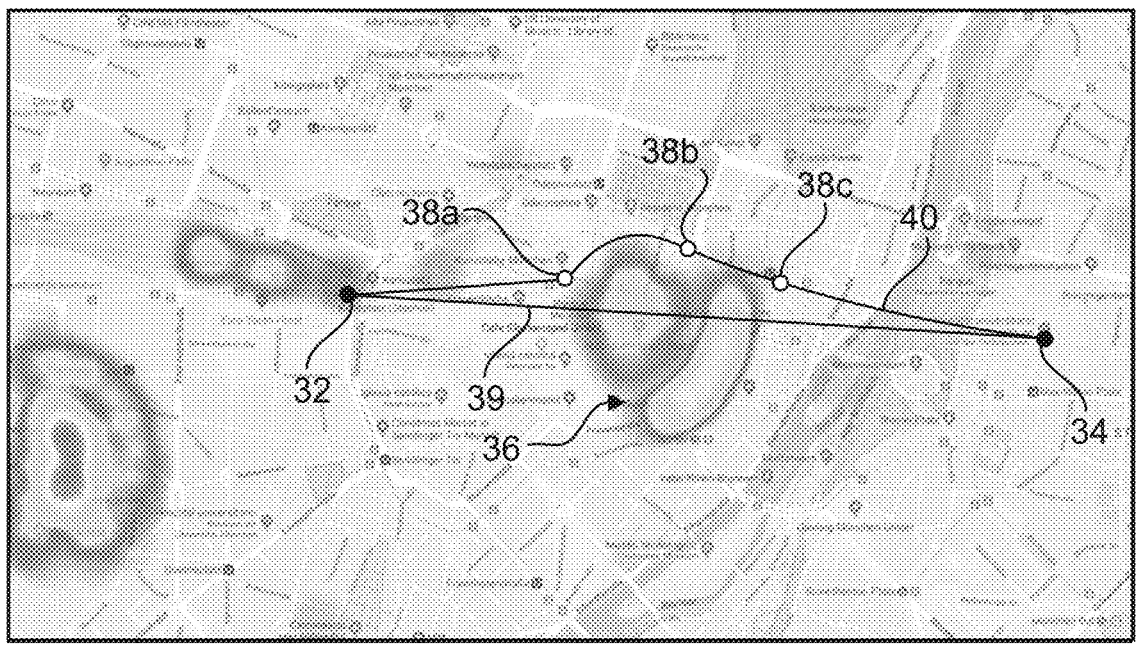
FIG. 3 shows an example for an optimized trajectory.

In FIG. 3 an example for an optimization result is demonstrated. Here, a starting point 32 for the UAV is shown, as well as an initial waypoint 34 in the form of a desired target for the UAV. This leads to an initial trajectory 39 in the form of a straight line. Due to several geometry constraints, which are fed into the trajectory optimization 28, an exemplary no-fly-zone 36 is avoided. During the optimization 28, new waypoints 38a, 38b and 38c are generated. It is conceivable that several loops of the method 2 are required to create these. As a result, an optimized trajectory 40 is provided, which is clearly situated outside the no-fly-zone 36 and allows a good signal quality.

Figure 4:
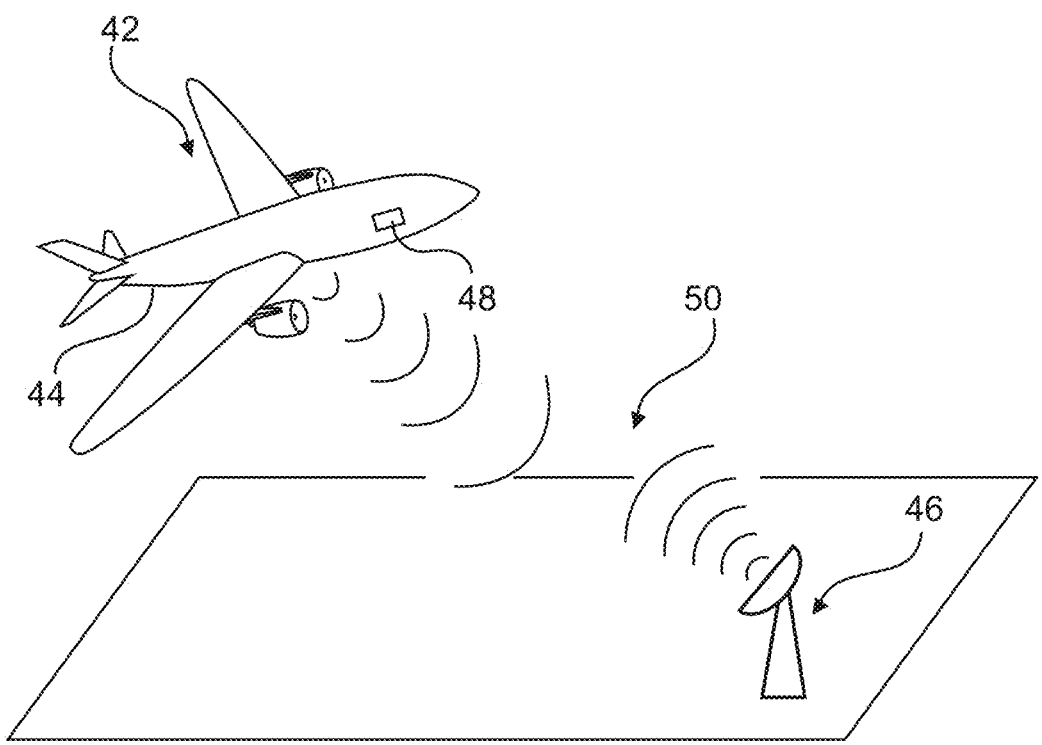
FIG. 4 shows a UAV in flight.

FIG. 4 shows a very schematic, simplified illustration of an unmanned aerial vehicle 42, which is in flight. It comprises an antenna 44 for communicating with a ground station 46. Furthermore, for following a trajectory, e.g. the trajectory 40 from FIG. 3, the unmanned aerial vehicle 42 comprises a computer unit in the form of a flight control unit 48. As stated above, the flight control unit 48 may be capable of conducting the method to according to the invention. However, also another, dedicated computer unit may be integrated on board the UAV 42 for conducting the method 2. Thus, a communication link 50 between the UAV 42 and the ground station 46 maintains a sufficient connection quality.

Figure 5:
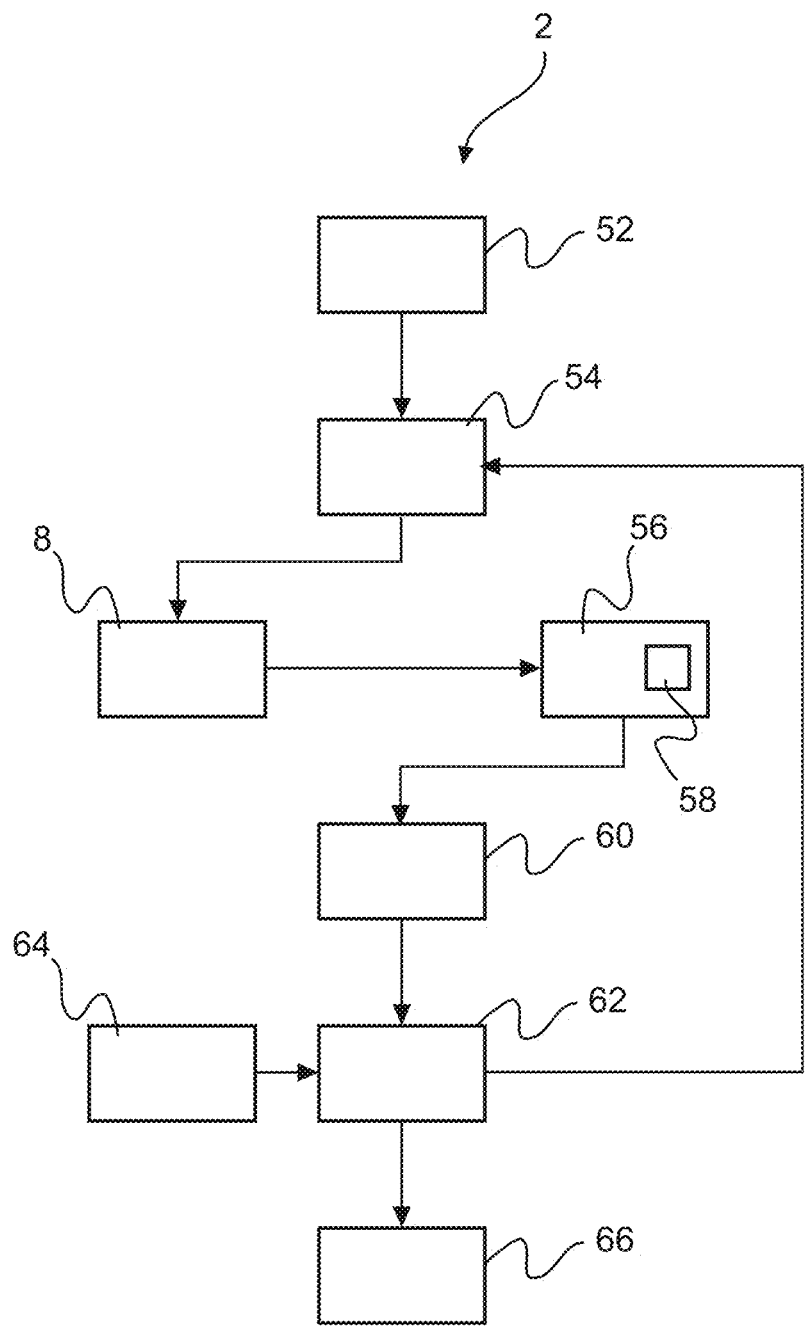
FIG. 5 shows a block-based diagram of the method according to the invention.

For the sake of completeness, FIG. 5 shows the method 2 according to the invention in a block-oriented diagram. The method 2 starts with defining 52 at least one initial waypoint 4 for creating the initial trajectory 39. Subsequently, at the same time or even before defining 52 the at least one initial waypoint 4, geographic information 14 for a plurality of positions along the trajectory are received 54. Under knowledge of these, the numerical simulation 8 of a flight of the unmanned aerial vehicle 42 along the trajectory 39 and a simulation 56 of the communication link 50 along a plurality of considered positions along the trajectory 39 and a ground station position of the ground station 46 is conducted. This comprises calculating 58 a quality factor for the communication link 50 under consideration of the geographic information 14 and simulated flight state variables 16 in multiple points along the trajectory, and comparing 60 the quality factors with a predetermined minimum quality factor. In case of an insufficient quality factor on the trajectory 39, a shape of the trajectory 39 is adjusted 62 to form an adjusted trajectory. This is repeated until the quality factors along the adjusted trajectory reach at least the minimum quality factor, to form an optimized final trajectory 40. This may then be provided 66 to flight control unit 48. To avoid an undesired event, adjusting 62 the shape of the trajectory 39 may include applying 64 at least one geometry constraint.

In addition, it should be pointed out that "comprising" does not exclude other elements or steps, and "a" or "an" does not exclude a plural number. Furthermore, it should be pointed out that characteristics or steps which have been described with reference to one of the above exemplary embodiments may also be used in combination with other characteristics or steps of other exemplary embodiments described above. Reference characters in the claims are not to be interpreted as limitations.

While at least one exemplary embodiment of the present invention(s) is disclosed herein, it should be understood that modifications, substitutions and alternatives may be apparent to one of ordinary skill in the art and can be made without departing from the scope of this disclosure. This disclosure is intended to cover any adaptations or variations of the exemplary embodiment(s). In addition, in this disclosure, the terms "comprise" or "comprising" do not exclude other elements or steps, the terms "a" or "one" do not exclude a plural number, and the term "or" means either or both. Furthermore, characteristics or steps which have been described may also be used in combination with other characteristics or steps and in any order unless the disclosure or context suggests otherwise. This disclosure hereby incorporates by reference the complete disclosure of any patent or application from which it claims benefit or priority.

REFERENCE NUMERALS 2 method
4 initial waypoint
6 defining initial waypoint
8 numerical simulation
10 dynamic UAV model
12 data collection
14 geographic information
16 state variables
18 shape information
20 antenna specific information
22 simulation of communication link
24 deterministic channel model
26 optimization
28 optimization
30 adjusted waypoint
32 starting point
34 initial waypoint
36 no-fly-zone
38 new waypoint (38a, 38b, 38c)
39 initial trajectory
40 optimized trajectory
42 unmanned aerial vehicle/UAV
44 antenna
46 ground station
48 computer unit/flight control unit 50 communication link
52 defining initial waypoint
54 receiving geographic information
56 simulation of communication link
58 calculating quality factor
60 comparing quality factors
62 adjust trajectory
64 applying geometry constraint
66 providing to flight control unit

The invention claimed is:

1. A method for operating an unmanned aerial vehicle, the method comprising:
defining at least one initial waypoint for creating an initial trajectory;
receiving geographic information for a plurality of positions along the initial trajectory;
conducting a numerical simulation of a communication link between the unmanned aerial vehicle along the initial trajectory and at least one predetermined ground station at a predetermined ground station position, which comprises calculating a quality factor for the communication link under consideration of the geographic information, and comparing the quality factor with at least one predetermined minimum quality factor, and
in case of an insufficient quality factor on the initial trajectory, adjusting the position of at least one waypoint to form an adjusted trajectory, and repeating the numerical simulation of the communication link until the quality factor along the adjusted trajectory reach at least the minimum quality factor, to form an optimized final trajectory,
wherein conducting the numerical simulation of the communication link comprises executing a deterministic channel model for a signal propagation depending on the geographic information and boundary conditions related to the unmanned aerial vehicle, and
wherein the step of adjusting the position of at least one waypoint to form the adjusted trajectory comprises a Pareto optimization, a particle swarm optimization or an optimization based on evolutionary algorithms.

2. The method according to claim 1, further comprising conducting numerical simulation of a flight of the unmanned aerial vehicle along the initial trajectory, wherein the calculating of the quality factor is conducted under consideration of simulated flight states along the initial trajectory.

3. The method according to claim 1, wherein the unmanned aerial vehicle is flight-controlled by a flight control unit to follow a given trajectory, wherein the method further comprises providing the final trajectory to the flight control unit.

4. The method according to claim 3, wherein conducting the numerical simulation of the flight comprises executing a dynamic model of the unmanned aerial vehicle and the flight control unit to control the dynamic model of the unmanned aerial vehicle to follow the given trajectory.

5. The method according claim 1, wherein receiving geographic information comprises retrieving terrain characteristics and elevation information along the initial trajectory.

6. The method according to claim 1, wherein the boundary conditions related to the unmanned aerial vehicle comprise a shape and a material of the unmanned aerial vehicle, as well as the installation position and orientation of at least one antenna on the unmanned aerial vehicle associated with the communication link.

7. The method according to claim 1, wherein the step of adjusting the position of at least one waypoint to form the adjusted trajectory comprises applying at least one geometry constraint in the adjusted trajectory.

8. The method according to claim 7, wherein the at least one geometry constraint is selected from a group of geometry constraints, the group consisting of:
maintaining a certain altitude above the terrain,
providing a minimum distance to buildings on the ground for collision avoidance,
restricting the adjusted trajectory to given map limits,
avoiding flight prohibited zones, and
maintaining a safety distance to surrounding aircraft.

9. The method according to claim 1, wherein defining at least one initial waypoint for creating the initial trajectory comprises defining a set of initial waypoints for a desired flight mission.

10. The method according to claim 1, wherein the numerical simulation of the communication link is continuously and repeatedly conducted during the flight of the unmanned aerial vehicle.

11. The method according to claim 1, wherein the numerical simulation of the communication link is conducted inside the unmanned aerial vehicle.

12. An unmanned aerial vehicle, comprising a computer unit, wherein the computer unit is configured for conducting the method according to claim 1.

13. The unmanned aerial vehicle according to claim 12, wherein the computer unit is a flight control unit.

* * * * *